Figure 1:
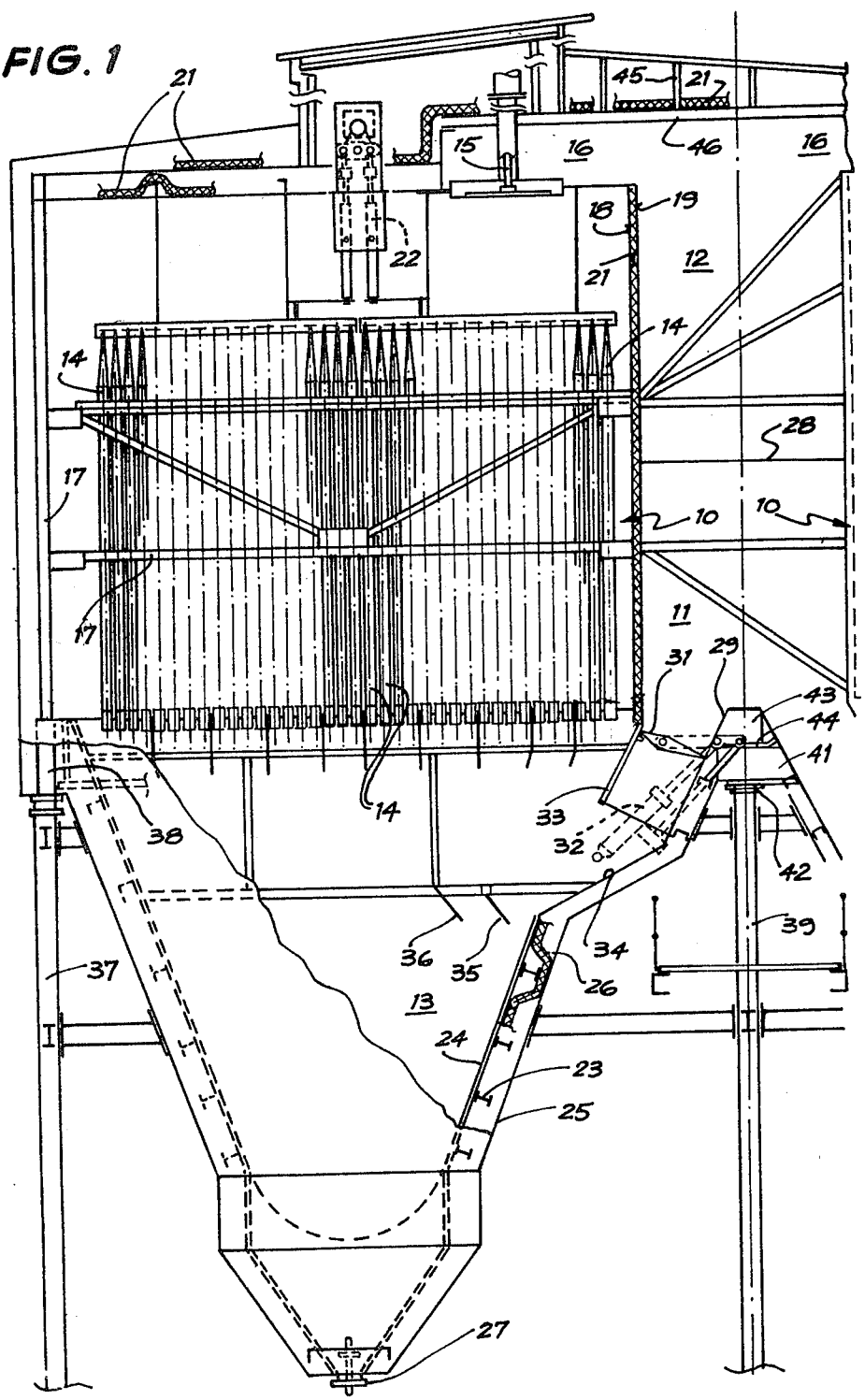

United States Patent [19]

Stephenson

[11] Patent Number: 4,465,498
[45] Date of Patent: Aug. 14, 1984

[54] GAS CLEANING INSTALLATION

[75] Inventor: Robert G. Stephenson, Panania, Australia

[73] Assignee: James Howden Australia Pty. Limited, Australia

[21] Appl. No.: 395,623

[22] Filed: Jul. 6, 1982

[30] Foreign Application Priority Data

Jul. 3, 1981 [AU] Australia ............................ PE9579

[51] Int. Cl.³ ............................................. B01D 46/02
[52] U.S. Cl. .................................. 55/341 NT; 55/304
[58] Field of Search ...................... 55/96, 97, 302–305, 55/341 R, 341 NT, 341 M, 341 PC; 52/263, 194

[56] References Cited

U.S. PATENT DOCUMENTS

| | | | |
|---|---|---|---|
| 2,391,534 | 12/1945 | Yerrick et al. | 55/341 PC |
| 2,932,362 | 4/1960 | Roper | 55/341 NT |
| 3,057,137 | 10/1962 | Perlis et al. | 55/303 |
| 3,078,646 | 2/1963 | Leech et al. | 55/96 |
| 3,484,800 | 12/1969 | Lange et al. | 52/263 |
| 3,992,177 | 11/1976 | Welteroth | 55/341 NT |
| 4,198,216 | 4/1980 | Whemsson | 55/341 R |
| 4,246,014 | 1/1981 | Wright et al. | 55/341 NT |
| 4,261,714 | 4/1981 | Peterson | 55/341 MC |
| 4,277,255 | 7/1981 | Apelgren | 55/96 |
| 4,360,370 | 11/1982 | McAndrew | 55/417 |

FOREIGN PATENT DOCUMENTS 925392  3/1955  Fed. Rep. of Germany ........ 55/302

Primary Examiner—Bernard Nozick

[57] ABSTRACT

A gas cleaning installation, such as might be used to filter particulate material from exhaust gases of a power generating boiler or the like, which comprises a pair of gas cleaning chambers each containing filtration means for a gas stream passing through the installation. The chambers are spaced apart to define between them a gas inlet passage or passages into the underside of each chamber and, above, the inlet passage or passages a gas outlet passage or passages. The gas outlet passage or passages together include a portion extending at least part way across the upper end of each chamber, the outlet passage or passages communicating with each chamber through an aperture extending between the interior of the chamber and the interior of the respective portions of the gas outlet passage or passages.

5 Claims, 1 Drawing Figure

GAS CLEANING INSTALLATION

The present invention relates to gas cleaning installations and more particularly to an installation comprising at least two gas cleaning chambers between which is defined an advantageous arrangement of inlet and outlet ducts.

The exhaust gas streams from boilers used in power stations and the like contain substantial quantities of particulate and chemical pollutants which, for environmental reasons, must be removed before the exhaust gas stream can be discharged into the atmosphere. Many of these boilers produce very large volumes of exhaust gasses, in some cases well in excess of 200,000 cubic foot/minute, and gas cleaning installations for such boilers must be very large to efficiently filter the gas stream. In view of the very large size of these gas cleaning installations it has become very important to improve the efficiency and the useful life of the installations while endeavouring to reduce the cost thereof. The present invention is designed to provide an improved gas cleaning installation which represents a useful alternative to known gas cleaning installations.

The present invention consists in a gas cleaning installation, comprising a gas cleaning chamber containing gas filtration means adapted to remove particulate matter entrained in a gas stream passing through the installation, a collection chamber beneath the gas cleaning chamber and in communication therewith to collect particulate matter falling from the gas filtration means, an inlet duct positioned adjacent one side of the gas cleaning chamber and in communication with the collection chamber, and an outlet duct positioned adjacent the one side of the gas cleaning chamber and in communication with the upper end of the gas cleaning chamber.

In a preferred embodiment of the invention the gas cleaning installation comprising a pair of gas cleaning chambers each containing filtration means for a gas stream passing through the installation, the chambers being spaced apart to define between them a gas inlet passage or passages into the underside of each chamber and above the inlet passage or passages a gas outlet passage or passages, the gas outlet passage or passages together including a portion extending at least part way across the upper end of each chamber, the outlet passage or passages communicating with each chamber through an aperture extending between the interior of the chamber and the interior of the respective portion of the gas outlet passage or passages.

The arrangement according to this invention can incorporate a number of highly advantageous features. By placing the inlet passage below the outlet passage and by making the floor of the inlet passage slope downwardly into a dust collector below the gas cleaning chamber it is possible to minimise dust build up within the passages and to provide a generally aerodynamically desirable configuration for the passages. The provision of the gas outlet passage with portions extending across the upper end of the gas cleaning chambers allows the aperture connecting the chamber to its associated gas outlet passage to be placed as close as possible to the centre of the upper end of the gas cleaning chamber which is aerodynamically desirable. The generally T-shaped cross section of the gas outlet passage with the gas inlet passage below the gas outlet assists casing integrity of the installation and gives a compact, economic, design.

The installation preferably comprises a series of pairs of gas cleaning chambers, the chamber of adjacent pairs being juxtaposed with one another while the gas inlet and outlet passages extend continuously between the pairs of chambers. In preferred embodiments of this invention the cross sectional area of the inlet passage diminishes along the length of the inlet passage from its beginning to its end as the volume of gas passing along the inlet passage diminishes as gas is diverted into the cleaning chambers. The outlet passage preferably increases in cross sectional area as the inlet passage decreases to allow for the increased volume of gas flowing into the outlet passage from the chambers. This variation in the size of the inlet and outlet passages is preferably achieved by sloping a common wall separating the inlet and outlet passages downwardly longitudinally of the passages.

In one preferred embodiment of the invention there is a single gas inlet passage and a single gas outlet passage, each of the passages servicing both of the, or each, pair of gas cleaning chambers. In an alternative preferred embodiment the gas inlet and outlet passages are duplicated by providing a vertical wall mid-way between the two, or each, pair of gas cleaning chambers. Thus there are provided a pair of side by side gas inlet and outlet passages each passage servicing only one of the, or each, pair of gas cleaning chambers.

The underside of each gas cleaning chamber is preferably provided with an essentially inverted frusto conical or frusto pyramidal dust collector. The dust collector having at its lower end discharge means to allow removal of collected dust. The gas inlet passage preferably has a bottom wall extending longitudinally of the passage of an inverted V-shaped cross section. One side of the bottom wall sloping into the dust collector beneath the chamber on one side of the gas inlet passage while the other side slopes into the dust collector of the other of the pair of chambers.

It is desirable that a damper or dampers rotatable about a longitudinal axis substantially parallel to the longitudinal axis of the inlet passage be provided between the inlet passage and each of the dust collectors to allow each one of the chambers to be individually isolated from the gas inlet passages.

This arrangement of the sloping floor of the inlet passage and the dampers provides a "live" floor to the inlet passages and effectively precludes dust build up in the gas inlet passage even when the gas cleaning installation is lightly loaded and the gas is travelling at low velocity.

Baffle means are preferably provided in each dust collector to direct the normally downward flow of gas introduced from the inlet passage into an essentially upward flow of gas into the filtration means in the associated gas cleaning chamber. The baffle means preferably includes a plurality of baffle plates extending across the collector and each disposed at an angle to the direction of impingement of the gas flow on that plate. The baffle plates should be so disposed and so angled that the incoming gas flow is distributed evenly over the underside of the gas cleaning chamber and so that there will not be undue dust build up on the baffle plates.

The gas filtration means may be of any conventional type of gas filtration equipment, however, preferably the gas filtration means comprises an array of vertically aligned elongate filter bags which are preferably connected at their upper ends to shaker means to discharge dust from the filter bags.

As the gas temperature will normally be quite high considerable thermal expansion and contraction will take place in the installation particularly when some or part of the installation is taken out of service. In order to allow for this thermal expansion and contraction each gas cleaning chamber is preferably mounted at least in part on beams which are themselves supported through planar bearings. In a particularly advantageous arrangement according to this invention the installation includes a first beam forming part of a support structure for one gas cleaning chamber which lies beneath the gas inlet passage and parallel to its longitudinal axis. The first beam is supported on a first planar bearing and in turn supports, through a second planar bearing a second, and parallel beam. The second beam forms part of the support structure for the other gas cleaning chamber. This advantageous arrangement, when used in conjunction with the essentially T-shaped arrangement of inlet and outlet passages, allows the thermal expansion and contraction of the installation to be taken up by relative movement between the first and second beams which will allow relative movement between the lower ends of the gas cleaning chambers. Relative movement between the upper ends of the chambers is taken up by flexing of the beams extending across the upper surface of the outlet passage.

Hereinafter given by way of example only is a preferred embodiment of the present invention described with reference to the accompanying drawing in which:

FIG. 1 is a transverse sectional view through one half of a gas cleaning installation according to this invention.

The gas cleaning installation comprises a pair of gas cleaning chambers 10 (only one of which is shown fully) which are separated by a space containing an inlet duct 11 and an outlet duct 12. The inlet duct 11 opens into a duct collection hopper 13 under each chamber 10. The gas, having passed through gas cleaning filter bags 14 in each chamber 10 is discharged through a poppet valve 15 into one of two arms 16 of the outlet one of which extends laterally part way across the top of each of the gas cleaning chambers 10.

Each gas cleaning chamber 10 comprises a structural steel frame 17 which is lined internally with panels 18 and clad externally with panels 19. The chambers 10 are insulated, as with insulation 21, positioned between panels 18 and 19. Housed within each chamber 10 is an array of the tubular filter bags 14 which are suspended by their upper ends to a shaker mechanism 22.

Each chamber 10 is disposed above an associated inverted frusto pyramidal dust collection hopper 13, formed of a frame 23 having internal cladding 24, external cladding 25 and insulation 26. The hopper 13 is provided at its lower end with a dust discharge opening 27.

Between the chambers 10 are defined the inlet duct 11 and above it the outlet duct 12 separated by a common wall 28. The inlet duct has a floor 29 of an inverted V-shaped cross section which slopes downwardly on each side of the mid line of the installation into the hoppers 13. Dampers 31 are provided between the inlet duct 11 and each hopper 13 which dampers 31 actuated by hydraulic rams 32. Gas entering one of the hoppers 13 is directed in a downward direction by baffle plate 33. This downward movement of the gas is desirable to bring about a gravitational separation of dust particles prior to the entry of the gas stream into the chamber 10 itself. The shoulder 34 of the hopper 13 and baffle plates 35 and 36 serve to turn the gas stream such that it flows upwardly into the filter bags 14 evenly over the whole area of the chamber 10.

The gas stream leaves the chamber 10 through the poppet valve 15 and enters the arm 16 of the outlet duct 12. The poppet valve allows the chamber to be isolated from the outlet duct for servicing and the like. The common wall 28 between the inlet duct 11 and the outlet duct 12 is slanted downwardly along its length such that the area of the inlet duct decreases as the area of the outlet duct increases.

Each chamber 10 is supported on its side distal to the other chamber on pillars 37 and beams 38. At their proximal sides they are supported by pillars 39 which supports beam 41 through a bearing 42 and beam 41 in turn supports beam 43 through bearing 44 allowing for thermal expansion and contraction between the chambers 10. The upper ends of chambers 10 are connected by beams 45 which support lining panels 46 facing the upper surface of the outlet duct 12. The beams 45 are designed to flex thereby taking up at the upper end of the chambers thermal expansion and contraction.

It will be recognised by persons skilled in the art that numerous variations and modifications may be made to the invention as described above without departing from the spirit or scope of the invention as broadly described.

I claim:

1. A gas cleaning installation, comprising:
   (a) a pair of gas cleaning chambers in spaced apart array, each chamber containing gas filtration means adapted to remove particulate matter entrained in a gas stream passing through the installation, the gas stream to be filtered entering the gas cleaning chamber from an underside thereof and leaving the gas cleaning chamber through an upper end thereof,
   (b) a collection chamber beneath each of the gas cleaning chambers and in communication with the underside of the respective gas cleaning chamber, baffle means positioned within each collection chamber such that gas entering that collection chamber is caused initially to flow downwardly and then to change direction and flow upwardly into the gas filtration means in the gas cleaning chamber, each collection chamber serving to collect particulate matter dropping out of the gas stream as it changes direction and particulate matter dropping out of the respective gas filtration means,
   (c) an inlet duct disposed between the pair of gas cleaning chambers and opening into each of the collection chambers, substantially the whole of the floor of the duct between the gas cleaning chambers sloping downwardly into the collection chambers,
   (d) an outlet duct disposed between the pair of gas cleaning chambers and above the inlet duct, the outlet duct extending at least partway across the top of each of the gas cleaning chambers and communicating with each gas cleaning chamber through an aperture in the upper end thereof, and
   (e) support means comprising a pair of beams lying below the inlet duct, the lower beam being supported on a planar bearing which rests on a pillar and being connected to and in part supporting one of the gas cleaning chambers and its associated collection chamber while the upper beam is supported on the lower beam and is in turn connected to and in part supports the other of the gas cleaning chambers and its associated collection chamber.

2. A gas cleaning installation as claimed in claim 1 in which the gas filtration means comprises an array of substantially parallel elongate filter bags which are open at their lower ends and closed at their upper ends.

3. A gas cleaning installation as claimed in claim 1 in which a damper rotatable about an axis substantially parallel to the longitudinal axis of the inlet duct is provided between the inlet duct and each collection chamber.

4. A gas cleaning installation as claimed in claim 1 in which a series of pairs of gas cleaning chambers are provided in the installation, the chambers of adjacent pairs being juxtaposed with one another, the inlet duct and outlet duct extend continuously between the pairs of chambers and in communication with each of them.

5. A gas cleaning installation as claimed in claim 4 in which the inlet and outlet ducts have a common wall and in which the cross sectional area of the inlet duct diminishes along its length from its beginning to its end and the outlet duct increases in cross sectional area correspondingly.

* * * * *